US010002291B2

United States Patent
Wshah et al.

(10) Patent No.: US 10,002,291 B2
(45) Date of Patent: Jun. 19, 2018

(54) METHOD AND SYSTEM OF IDENTIFYING FILLABLE FIELDS OF AN ELECTRONIC FORM

(71) Applicant: Xerox Corporation, Norwalk, CT (US)

(72) Inventors: Safwan R. Wshah, Webster, NY (US); Martin S. Maltz, Rochester, NY (US); Dennis L. Venable, Marion, NY (US); Saurabh Prabhat, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 114 days.

(21) Appl. No.: 15/164,074

(22) Filed: May 25, 2016

(65) Prior Publication Data

US 2017/0344820 A1 Nov. 30, 2017

(51) Int. Cl.
*G06K 9/00* (2006.01)
*G06F 17/24* (2006.01)
*G06F 3/0481* (2013.01)
*G06F 3/0484* (2013.01)

(52) U.S. Cl.
CPC ..... *G06K 9/00449* (2013.01); *G06F 3/04812* (2013.01); *G06F 3/04842* (2013.01); *G06F 17/243* (2013.01); *G06K 9/00463* (2013.01)

(58) Field of Classification Search
CPC .................................................. G06F 17/243
See application file for complete search history.

(56) References Cited

U.S. PATENT DOCUMENTS

| | | | |
|---|---|---|---|
| 5,748,809 A | 5/1998 | Hirsch | |
| 7,509,346 B2 | 3/2009 | Mathew | |
| 8,233,714 B2 | 7/2012 | Zuev et al. | |
| 8,595,230 B1 | 11/2013 | Djabarov | |
| 8,706,762 B1 | 4/2014 | Patzer et al. | |
| 8,825,592 B2 | 9/2014 | Lobo et al. | |
| 8,892,990 B2 | 11/2014 | Barrus | |
| 2012/0063684 A1* | 3/2012 | Denoue | G06F 17/243 382/175 |
| 2012/0137207 A1 | 5/2012 | Heinz et al. | |
| 2015/0317296 A1* | 11/2015 | Vohra | G06F 17/30 715/221 |
| 2016/0217119 A1* | 7/2016 | Dakin | G06F 17/243 |

* cited by examiner

*Primary Examiner* — Keith Bloomquist
(74) *Attorney, Agent, or Firm* — Fox Rothschild LLP (57) ABSTRACT

A system of identifying one or more fillable fields of an electronic form may include an electronic device, and a computer-readable storage medium that includes one or more programming instructions. The programming instructions are configured to instruct the electronic device to receive an electronic form, identify fillable field candidates of the electronic form, and determine, for each fillable field candidate, whether the fillable field candidate is a fillable field. The system updates metadata associated with the electronic form by applying a sequencing framework to only the fillable fields by obtaining position information for each fillable field that indicates a position of the fillable field on the document, sorting the fillable fields based on the position information to form a sequence of fillable fields, determining a designator to each fillable field that indicates a position of a corresponding fillable field in the sequence, and storing the designator.

18 Claims, 10 Drawing Sheets

Employment:
Primary Holder

1. ☐ Salaried
2. Company name:
3. Designation:
4. ☐ Self employed/professional
   - 5. ☐ CA  6. ☐ Doctor  7. ☐ Law(Secretarial)  8. ☐ Engineer
   - 9. ☐ Management Consultant  10. ☐ Other (Specify) 11. ____
   - 12. ____
13. ☐ Business

METHOD AND SYSTEM OF IDENTIFYING FILLABLE FIELDS OF AN ELECTRONIC FORM

BACKGROUND

Completing forms electronically provides many benefits such as easy editing, easy distribution and easy storage. Tools exist to create forms that can be edited electronically, but creating an electronically editable form can be tedious and time-intensive.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimensions recited below. As used herein, the term "comprising" means "including, but not limited to."

In an embodiment, a system of identifying one or more fillable fields of an electronic form may include an electronic device, and a computer-readable storage medium that includes one or more programming instructions. The programming instructions are configured to instruct the electronic device to receive an electronic form, wherein the electronic form comprises an image of a document, identify one or more fillable field candidates of the electronic form, and determine, for each fillable field candidate, whether the fillable field candidate is a fillable field. The system updates metadata associated with the electronic form by applying a sequencing framework to only the fillable fields by obtaining position information for each fillable field that indicates a position of the fillable field on the document as displayed via a display device, sorting the fillable fields based on the position information to form a sequence of fillable fields, determining a designator to each fillable field that indicates a position of a corresponding fillable field in the sequence, and storing the designator in a data store such that it is associated with the corresponding fillable field.

The system may determine whether the fillable field candidate is a fillable field by using a seed fill algorithm to identify one or more box candidates from the fillable field candidates, and, for one or more of the box candidates: generate an out-border for the box candidate, wherein the out-border is a rectangular zone that surrounds an outer portion of the box candidate, generate an in-border for the box candidate, wherein the in-border is a rectangular zone that encompasses at least a portion of the box candidate, determine a histogram of pixels of the box candidate between the in-border and the out-border, determine a ratio of black pixels to white pixels of the histogram, and in response to the ratio exceeding a threshold value, determining that the box candidate is a fillable field, otherwise, determining that the box candidate is not a fillable field.

The system may in response to determining that the box candidate is a fillable field, determine whether the box candidate is a checkbox. In response to determining that the box candidate is a checkbox, the system may add the box candidate to a checkbox list, otherwise, add the box candidate to a box list. In an embodiment, the system may determine whether the fillable field candidate is a line by obtaining dimensions for the fillable field candidate, that includes a height value and a length value, and in response to the height value not exceeding a first threshold value and the length value exceeding a second threshold value, identifying the fillable field candidate as a fillable field.

Alternatively, the system may determine whether the fillable field candidate is a line by, in response to the length value not exceeding a first threshold value and the height value exceeding a second threshold value, identifying the fillable field candidate as a fillable field.

The system may sort the fillable fields from a top of the document to a bottom of the document, and from a left side of the document to a right side of the document based on the position information.

In an embodiment, the system may receive a selection of a fillable field from a user, and cause a cursor to be displayed on a display device at the selected fillable field. The system may receive an indication from the user to move to a next fillable field, retrieve the designator associated with the selected fillable field from the data store, determine a next designator in the sequence, identify, from the data store, the fillable field associated with the next designator, and automatically cause the cursor to be displayed on the display device at the fillable field associated with the next designator.

The system may receive a selection of a fillable field from a user, and cause a cursor to be displayed on a display device at the selected fillable field. The system may determine that the cursor should be moved to a next fillable field, retrieve the designator associated with the selected fillable field from the data store, determine a next designator in the sequence, identify, from the data store, the fillable field associated with the next designator, and automatically cause the cursor to be displayed on the display device at the fillable field associated with the next designator.

In an embodiment, the system may capture, by an image capture device of the electronic device, the image of the document.

DETAILED DESCRIPTION

The following terms shall have, for purposes of this application, the respective meanings set forth below:

A "computing device" or "electronic device" refers to a device that includes a processor and non-transitory, computer-readable memory. The memory may contain programming instructions that, when executed by the processor, cause the computing device to perform one or more operations according to the programming instructions. As used in this description, a "computing device" or "electronic device" may be a single device, or any number of devices having one or more processors that communicate with each other and share data and/or instructions. Examples of computing devices or electronic devices include, without limitation, personal computers, servers, mainframes, gaming systems, televisions, and portable electronic devices such as smartphones, personal digital assistants, cameras, tablet computers, laptop computers, media players and the like.

An "electronic form" refers to an electronic document or file. In certain embodiments, an electronic form may include one or more fillable fields.

A "fillable field" refers to a portion of an electronic document or file that is editable by a user. Examples of fillable components include, without limitation, a check box, a text field, a line, a radial button and/or the like.

The terms "memory," "computer-readable medium" and "data store" each refer to a non-transitory device on which computer-readable data, programming instructions or both are stored. Unless the context specifically states that a single device is required or that multiple devices are required, the terms "memory," "computer-readable medium" and "data store" include both the singular and plural embodiments, as well as portions of such devices such as memory sectors.

Figure 1:
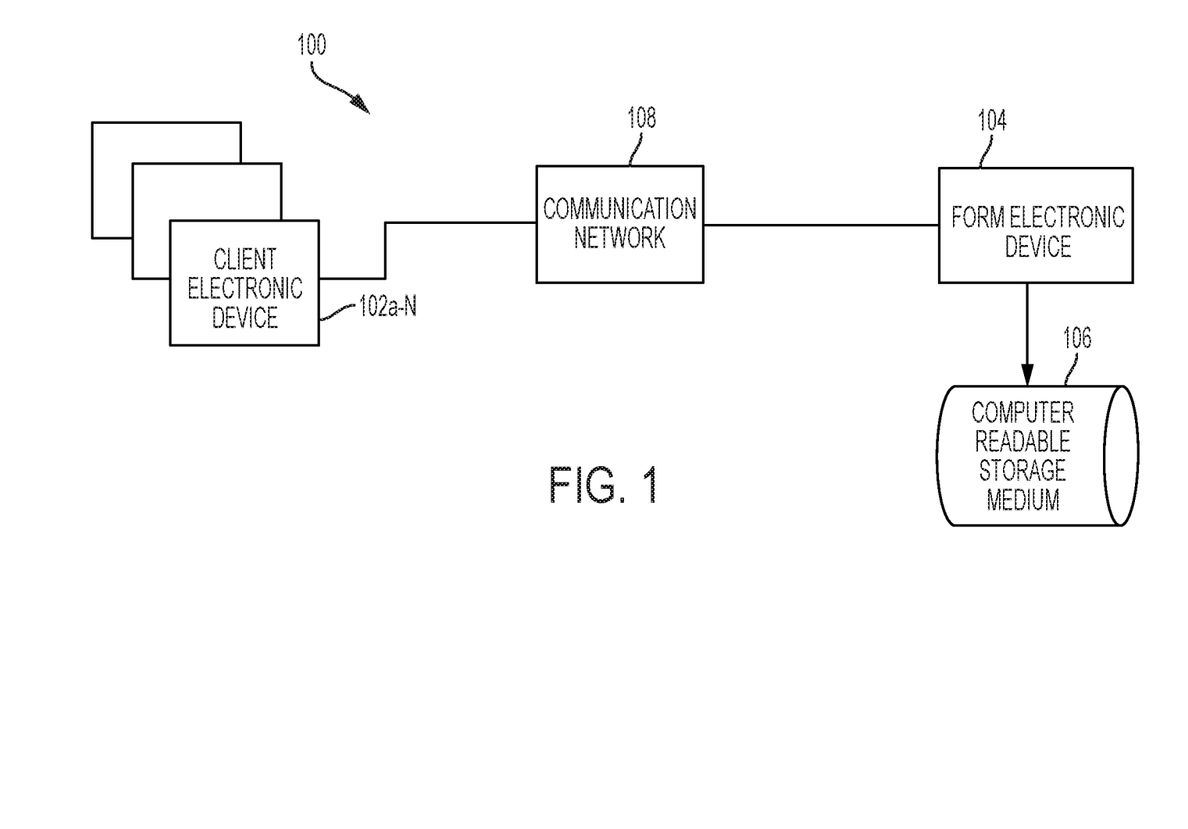
FIG. 1 illustrates an example system of identifying fillable components of an electronic document according to an embodiment.

FIG. 1 illustrates an example system of identifying fillable components of an electronic document according to an embodiment. As illustrated by FIG. 1, the system 100 may include one or more client electronic devices 102a-N, a form electronic device 104 and a computer-readable storage medium 106. In an embodiment, one or more of the client electronic devices 102a-N may include, or be in communication with, an image capture device such as, for example, a scanner, a camera and/or the like. One or more of the client electronic devices 102a-N may be in communication with the form electronic device 104 via a communication network 108. A communication network 108 may be a local area network (LAN), a wide area network (WAN), a mobile or cellular communication network, an extranet, an intranet, the Internet and/or the like. In various embodiments, a client electronic device 102a-N may be a mobile electronic device such as, for example, a smartphone, a tablet and/or the like.

Figure 2:
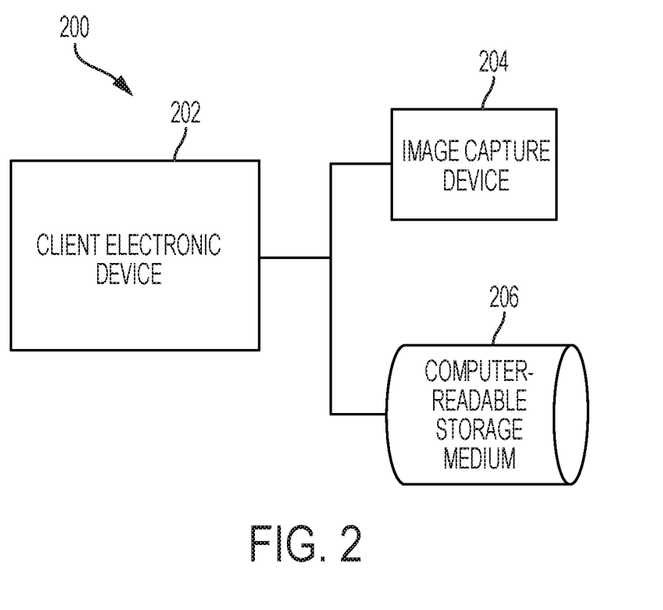
FIG. 2 illustrates an alternative system for identifying fillable components according to an embodiment.

FIG. 2 illustrates an alternative system for identifying fillable components according to an embodiment. As illustrated by FIG. 2, a system 200 may include a client electronic device 202. The client electronic device may include or be in communication with an image capture device 204 and a computer-readable storage medium 206.

One or more of the steps or processes described in this disclosure may be performed by a client electronic device, a form electronic device or a combination of one or more client electronic devices and a form electronic device.

Figure 3:
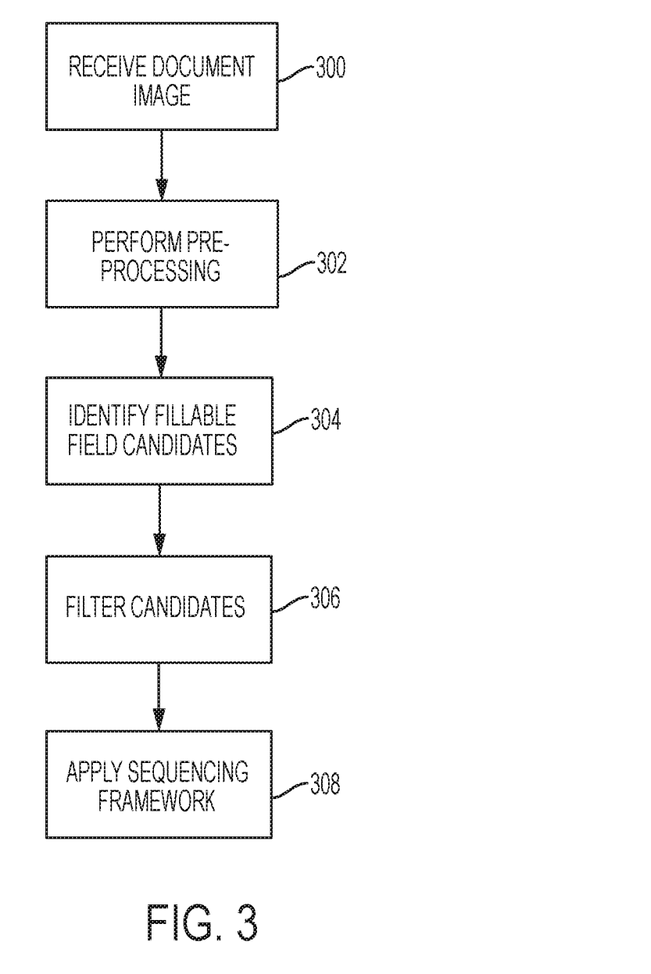
FIG. 3 illustrates an example method of identifying fillable fields according to an embodiment.

FIG. 3 illustrates an example method of identifying fillable fields according to an embodiment. As shown by FIG. 3, an image of a document or portion of a document may be received 300 by an electronic device. The image may be of a hard copy or physical document, such as, for example, a pre-printed form. In an embodiment, an electronic device may receive 300 an image of a document from an image capture device. For instance, a camera of an electronic device may capture an image of a document. In another embodiment, an electronic device may identify an electronic document by recognizing when an electronic document is opened or accessed by a user. For instance, a processor may recognize when a user accesses a webpage, portable document format (PDF) document, and/or the like.

An electronic device may perform 302 pre-processing operations on the received document. The pre-processing operations may include, without limitation, cleaning the image, deskewing the image, converting the image to binary, estimating one or more image parameters such as, for instance, resolution and text size and/or the like.

In an embodiment, a processor may identify 304 one or more fillable field candidates from the document. A fillable field candidate may be a portion of a document that might be a fillable field. An electronic device may create a list of fillable field candidates by performing connected component analysis. Connected component analysis may identify one or more fillable field candidates of a document. Examples of fillable fields may be a check box, a free text field, lines, boxes, dashed or other formatted lines and/or the like. In certain embodiments, information may be entered into an electronic form using one or more input devices such as, for example, a finger or a stylus on a touch screen display. For instance, a processor may cause one or more fillable fields to be displayed to a user via a display device associated with a client electronic device. A user may enter, select and/or modify information of a fillable field by selecting the fillable field or an area in or around the fillable field. In the case of a touch screen display device, a user may use his or her finger to touch the fillable field or an area surrounding the fillable field. One or more fillable field candidates may be identified by coordinates, position, dimensions and/or the like. For example, a fillable field candidate may be identified by a coordinate pair (x, y value) and a delta x ($\Delta$x) and delta y ($\Delta$y) value. A delta x value may refer to a length of a fillable field candidate, whereas a delta y value may refer to a height of a fillable field candidate.

Figure 9:
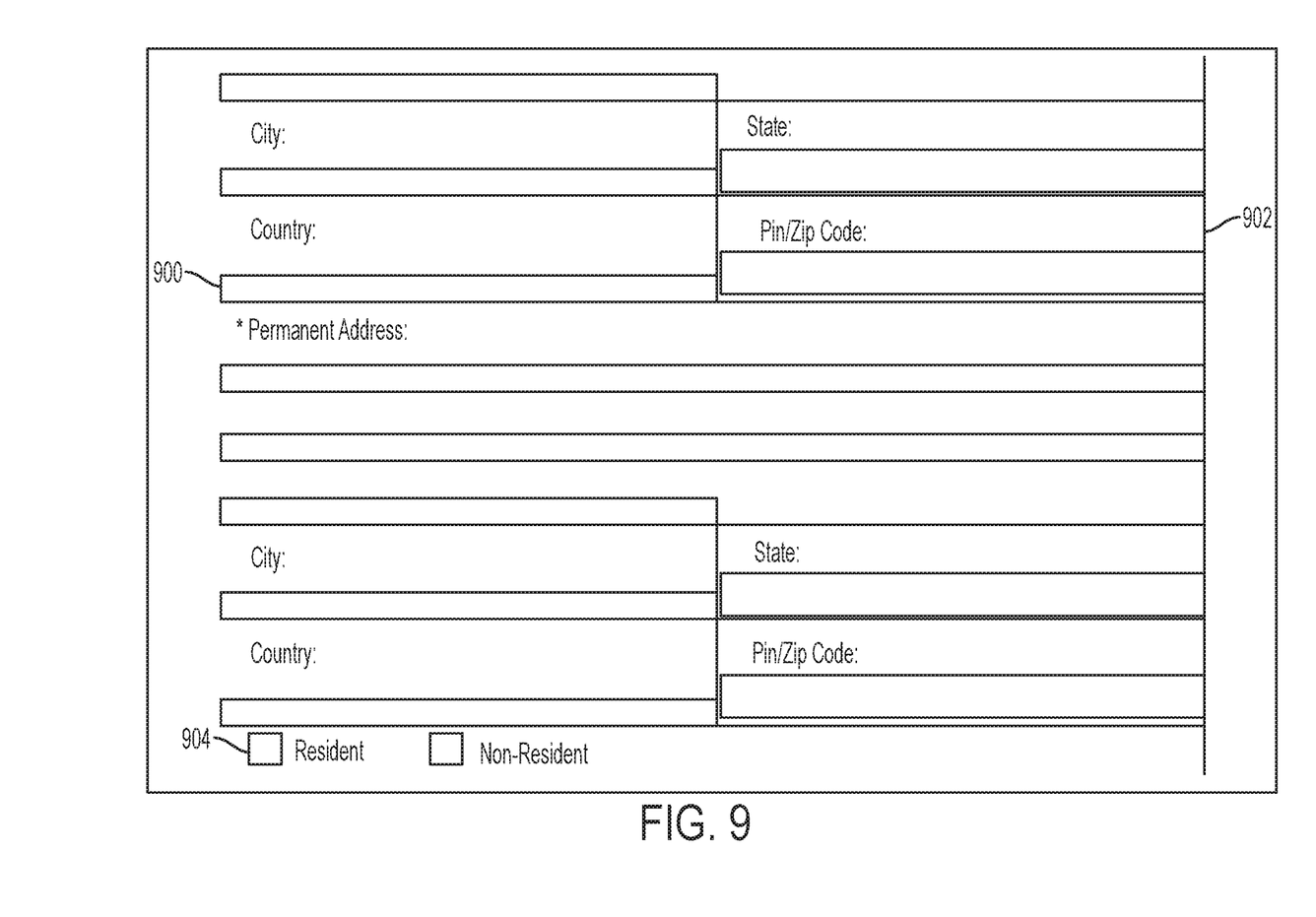
FIG. 9 illustrates a document having line fillable areas, boxes and checkboxes according to an embodiment.

In an embodiment, an electronic device may use image segmentation, seed fill analysis (or flood fill analysis), connected component analysis, morphological operations, histogram information and/or the like to identify 304 one or more fillable field candidates. FIG. 9 illustrates a document having line fillable areas 900, boxes 902 and checkboxes 904 according to an embodiment.

Figure 4:
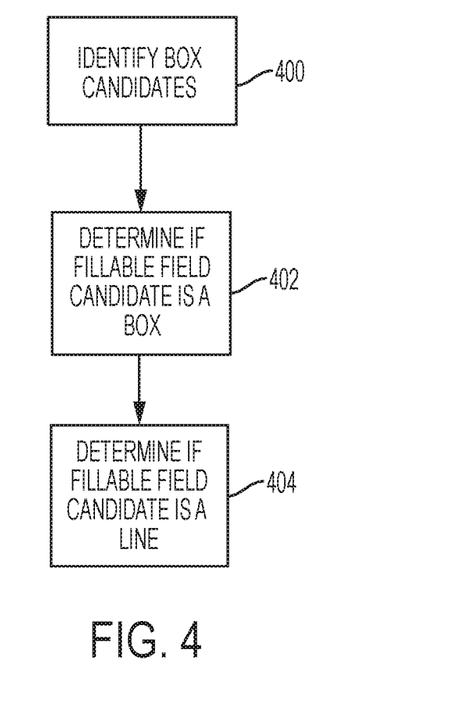
FIG. 4 illustrates a flow chart of an example method of filtering fillable field candidates according to an embodiment.

In an embodiment, an electronic device may filter 306 the detected fillable field candidates. For instance, noise and redundancy may be filtered 306 from the detected fillable fields. FIG. 4 illustrates a flow chart of an example method of filtering fillable field candidates according to an embodiment.

Figure 5:
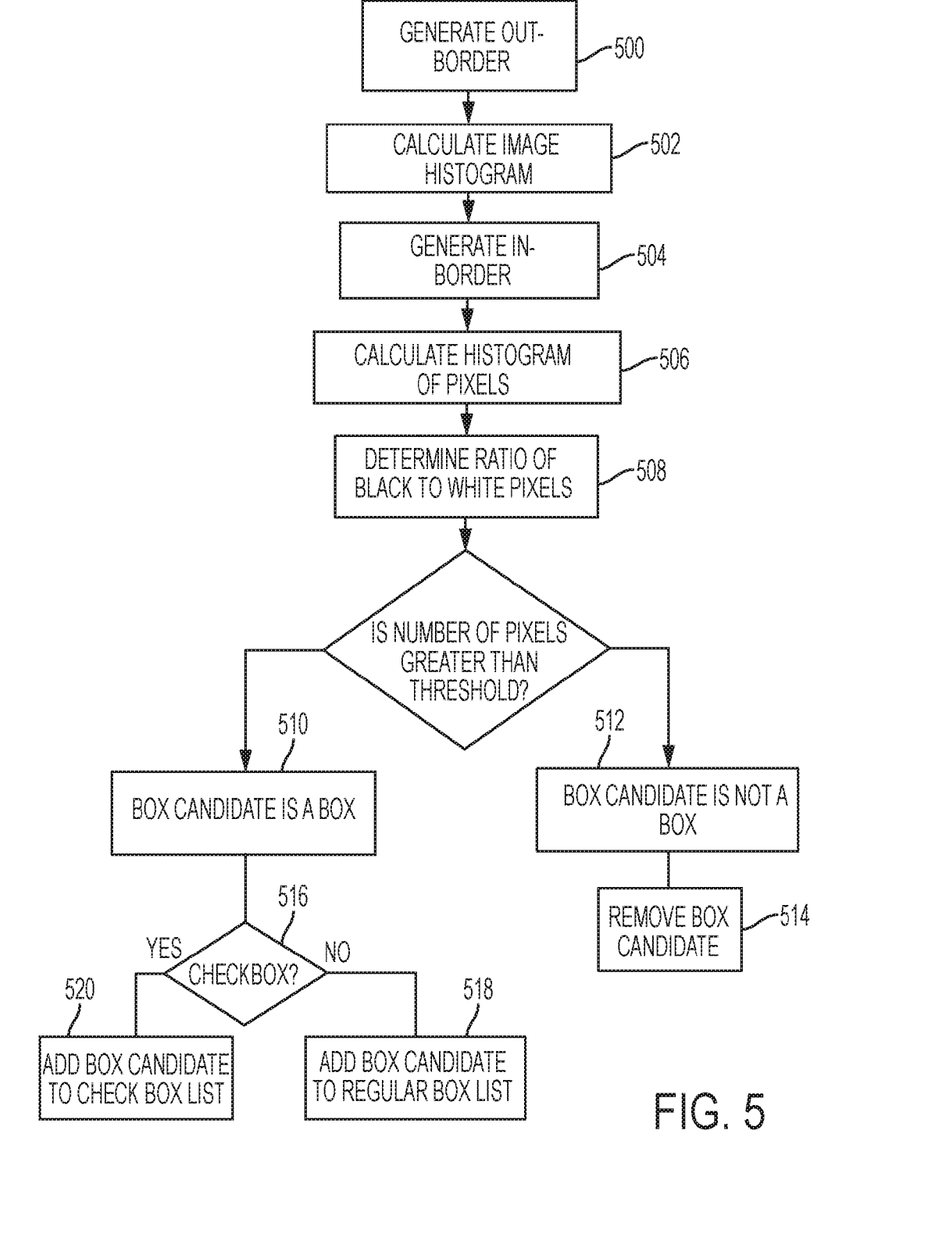
FIG. 5 illustrates a flow chart of an example method of determining if a box candidate is a box according to an embodiment.

As illustrated by FIG. 4, an electronic device may use an algorithm, such as a seed fill (or flood fill) algorithm to identify 400 one or more of the fillable field candidates as box candidates. A box candidate may be a fillable field candidate that includes connected components, such as lines, encompassing (or partially encompassing) an area. An electronic device may determine 402 if an identified box candidate is actually a box (and therefore actually a fillable field). FIG. 5 illustrates a flow chart of an example method of determining 402 if a box candidate is a box according to an embodiment.

Figure 6A:
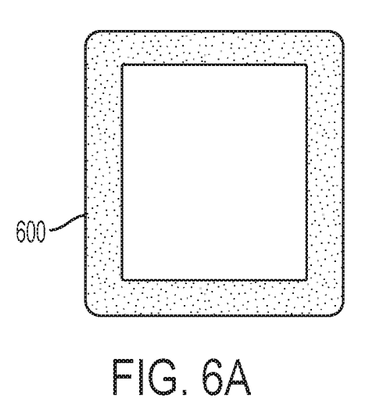
FIGS. 6A and 6B illustrate example box candidates according to various embodiments.
Figure 6B:
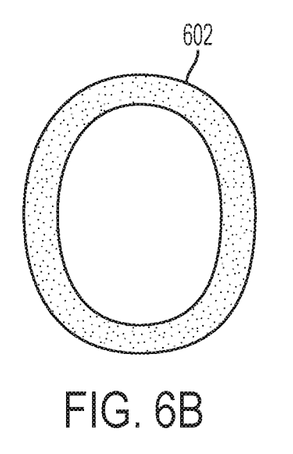
Figure 7A:
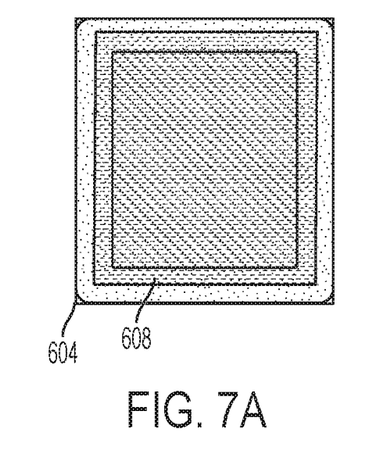
FIGS. 7A and 7B illustrate example out-borders according to various embodiments.
Figure 7B:
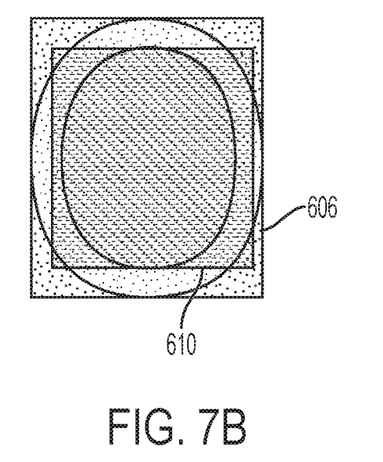

As illustrated by FIG. 5, an electronic device may generate 500 a rectangular zone, referred to in this disclosure as an out-border, around a box candidate. The out-border may be drawn around the border of the box candidate. For example, FIGS. 6A and 6B illustrate example box candidates 600, 602. FIG. 6A illustrates a square-shaped box candidate 600, while FIG. 6B illustrates an example oval-shaped box candidate 602. FIGS. 7A and 7B illustrate example out-borders 604, 606 for the box candidates shown in FIGS. 6A and 6B according to various embodiments.

Referring back to FIG. 5, an electronic device may calculate 502 an image histogram ($H_{image}$) of an image intensity of the out-border for a box candidate. In an embodiment, an image intensity value may be binary, with a value of '0' representing black, and a value of '255' representing white.

An electronic device may generate 504 an inner rectangular zone inside the out-border (in-border) for a box candidate according to an embodiment. The size of the in-border may be based on the white-to-black pixel ratio in the $H_{image}$ for the box candidate. For example, if the white-to-black ratio is large, then the in-border may also be considered large. However, the in-border may not be equal in size or larger than the out-border for a box candidate. FIGS. 7A and 7B illustrate example in-borders 608, 610 for the box candidates shown in FIGS. 6A and 6B according to various embodiments.

In an embodiment, an electronic device may calculate 506 a histogram of the pixels of the box candidate between the in-border and the out-border ($H_{borders}$). An electronic device may determine 508 a ratio of black to white pixels of $H_{borders}$. If the determined ratio is greater than a certain threshold value, the electronic device may determine 510 that the box candidate is a box. Otherwise, the electronic device may determine 512 that the box candidate is not a box. For example, if the determined ratio is greater than 75%, an electronic device may determine 510 that the box candidate is a box. Otherwise, the electronic device may determine 512 that the box candidate is not a box. Additional and/or alternate threshold values may be used within the scope of this disclosure.

If the electronic device determines 512 that the box candidate is not a box, the electronic device may remove 514 the box candidate from the group of box candidates.

If the electronic device determines 510 that the box candidate is a box, the electronic device may determine 516 if the box candidate is a checkbox. An electronic device may determine 516 if a box candidate is a checkbox based on one or more criteria. For example, an electronic device may consider the geometric properties of the box candidate. A box candidate having a square shape may be more likely to be a checkbox, whereas a box candidate having a rectangular shape may be less likely to be a checkbox. As another example, an electronic device may consider the size of box candidate. A box candidate having a smaller relative size may be more likely to be a checkbox, whereas a box candidate having a larger relative size may be less likely to be a checkbox. As another example, a box candidate that is not part of a chain of box candidates may be more likely to be a checkbox, whereas a box candidate that is a part of a chain of box candidates may be less likely to be a checkbox.

In an embodiment, if an electronic device determines that a box candidate is not a checkbox, the electronic device may add 518 the box candidate to a list of regular boxes. If an electronic device determines that a box candidate is a checkbox, the electronic device may add 520 the box candidate to a check box list.

Referring back to FIG. 4, an electronic device may determine 404 whether a fillable field candidate is a line. An electronic device may use connected component analysis, or another suitable method, to identify x,y coordinates associated with a fillable field candidate, as well as delta x and delta y values associated with a component according to an embodiment. Table 1 illustrates example x, y coordinates and delta x, delta y values for example fillable field candidates according to various embodiments.

TABLE 1

| X | Y | Delta x | Delta y |
|---|---|---------|---------|
| 604 | 292 | 130 | 15 |
| 618 | 292 | 13 | 15 |
| 632 | 292 | 14 | 15 |
| 648 | 292 | 12 | 15 |
| 707 | 292 | 12 | 15 |
| 728 | 292 | 140 | 15 |
| 85 | 292 | 13 | 16 |
| 101 | 292 | 12 | 16 |
| 139 | 292 | 18 | 16 |
| 156 | 292 | 12 | 16 |
| 170 | 292 | 17 | 16 |
| 185 | 292 | 14 | 16 |
| 287 | 292 | 20 | 16 |
| 309 | 292 | 130 | 16 |
| 339 | 292 | 14 | 16 |

In an embodiment, an electronic device may identify fillable field candidates having a long and flat shape as line fillable fields. Fillable field candidates having a delta x that exceeds a threshold value and a delta y value that does not exceed an applicable threshold value may be identified as a horizontal line fillable fields. Similarly, fillable field candidates having a delta x value that does not exceed a threshold value, and a delta y value that exceeds another threshold value may be identified as a vertical line fillable field. An electronic device may add the line fillable fields it identifies to a line list.

An electronic device may update metadata associated with an electronic form. In an embodiment, an electronic device may update metadata associated with an electronic form by applying 308 a sequencing framework to one or more of the fillable fields. In an embodiment, an electronic device may only apply a sequencing framework to fillable fields that have been identified as such by an electronic device. For instance, an electronic device may only apply a sequencing framework to those fillable fields identified on a box list, a checkbox list or a line list.

A sequencing framework may provide a sequence of fillable fields that may be tabbed or cycled through by a user. For instance, if a sequencing framework includes {Field A, Field B, Field C}, then a user may easily be able to access Field A followed by Field B followed by Field C followed by Field A, and so on, by providing an input indication such as, for example, pressing a "tab" button on a keyboard, selecting an icon on a mobile device and/or the like. As such, a user may be able to move between fillable fields without manually adjusting a cursor position. This may be useful for users working on a tablet or other device having coarse cursor positioning.

Figure 8:
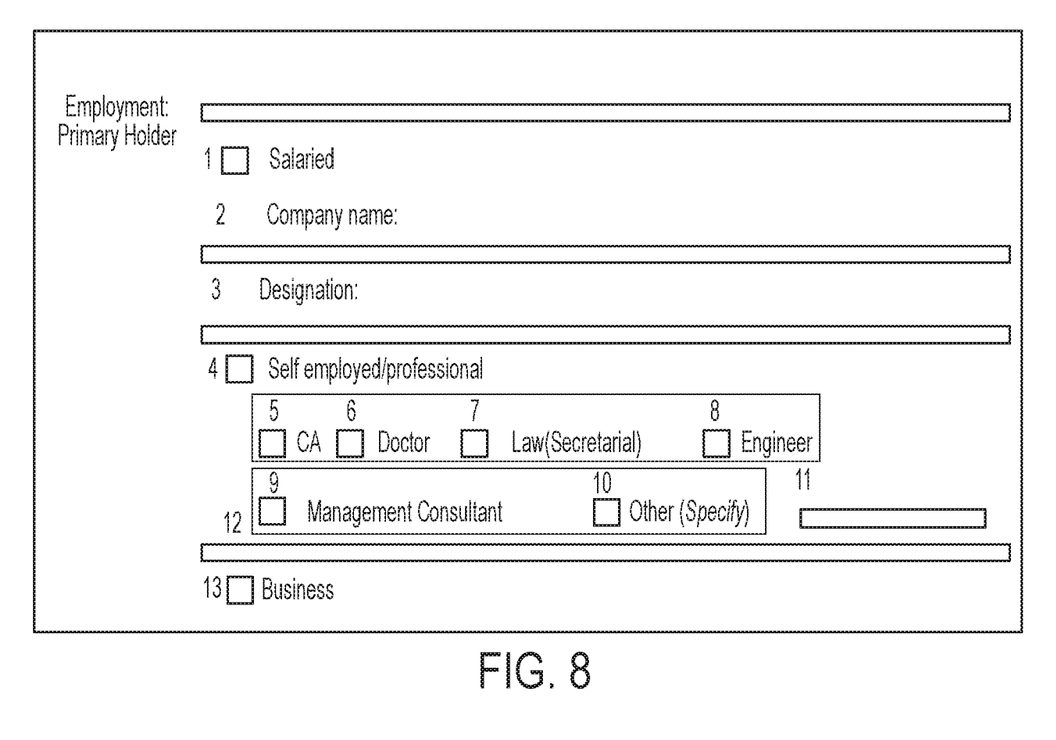
FIG. 8 shows an example sequencing framework according to an embodiment.

An electronic device may apply 308 a sequencing framework to one or more fillable fields based on a position of the fillable fields in a document. An electronic device may obtain position information associated with one or more fillable fields. Position information may include information about a location of a fillable field on a document such as, for example, coordinates. The electronic device may sort the components based on the corresponding location information. For instance, components may be sorted vertically and horizontally. A sequencing framework may be applied in the order of top to bottom, right to left. FIG. 8 shows an example sequencing framework according to an embodiment. As shown by FIG. 8, a document may have fillable checkboxes and lines. The sequencing framework has been applied to the checkboxes and lines top to bottom and left to right, and the order of the fillable components in the framework is shown in FIG. 8 by the numbers shown in proximity to the components.

In an embodiment, applying a sequencing framework to a fillable field may involve applying a tag or other designator to a fillable field that identifies its position in the sequence. This tag or designator may be created and added to a metadata file associated with an electronic form. An electronic device may identify a fillable field that a cursor is currently positioned on or in by its designator. In response to receiving input from a user indicating that a next fillable field is to be found, an electronic device may determine a next designator in the sequence, identify a fillable field associated with that designator, and position the cursor at that fillable field. Input from a user may indicate a next fillable field or a previous fillable field. As such, a user may be able to move both forward and backward through a sequence of fillable fields.

In an alternate embodiment, an electronic device may automatically determine a next designator in a sequence, identify a fillable field associated with that designator, and position the cursor at that fillable field without receiving user input. For instance, an electronic device may automatically move a cursor to a next or previous fillable field once input is received for a current fillable field. For instance, an electronic document may include fillable fields where a user can enter the user's name. Each letter of the name may be entered in a different fillable field. Once a user enters a character is a fillable field, an electronic device may automatically advance the cursor to the next fillable field so that the user can enter the next letter of the name.

Figure 10:
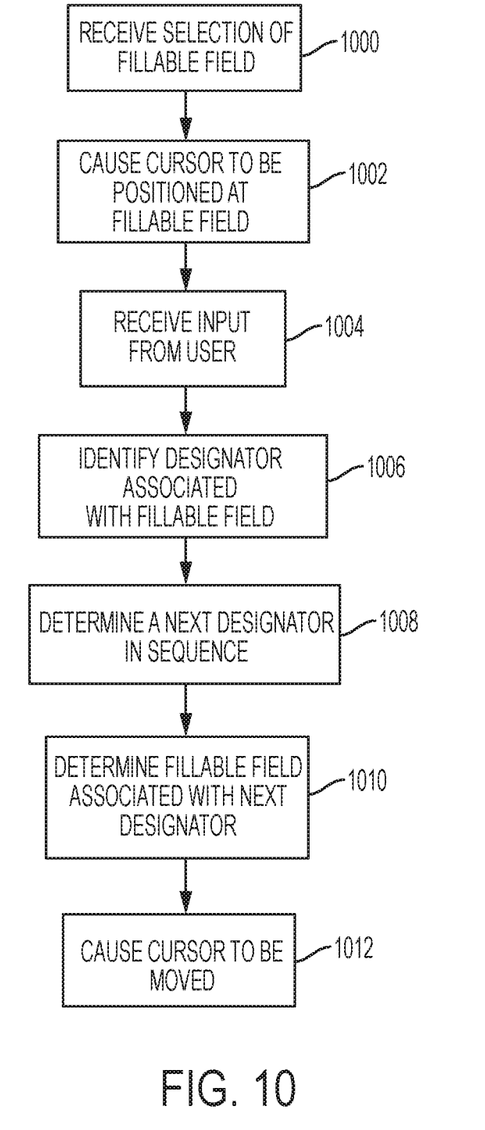
FIG. 10 illustrates a flow chart of an example method of using a sequencing framework according to an embodiment.

FIG. 10 illustrates a flow chart of an example method of using a sequencing framework according to an embodiment. As shown by FIG. 10, an electronic device may receive 1000 a selection of a fillable field of an electronic document. In response to receiving the selection, the electronic device may cause 1002 a cursor to be positioned at the selected fillable field via a display device. For example, an electronic device may cause 1002 a cursor to be positioned in a box fillable field or toward a left side of a horizontal line fillable field. Additional and/or alternate cursor locations may be used within the scope of this disclosure.

In an embodiment, an electronic device may receive 1004 input from a user indicating that the cursor should be moved to a different fillable field. The input may be selection of a button, such as a "tab" button, or a selection of another input mechanism such as, for example, a forward arrow icon or button, a backward arrow icon or button and/or the like.

In response to receiving the input, the electronic device may determine to which fillable field the cursor should be moved. The electronic device may identify 1006 a designator associated with the fillable field where the cursor is currently located. The electronic device may determine 1008, based on the received input, a next designator in a sequence, and may determine 1010 a fillable field associated with that next designator. The electronic device may cause 1012 the cursor to be moved to the fillable field associated with the next designator.

For instance, a sequencing framework may include {Field A, Field B, Field C}. Field A may be associated with a designator '1', Field B may be associated with a designator '2', and Field C may be associated with a designator '3.' A user may manually position a cursor at Field A, and may enter a value for the field. When finished, the user may press a "tab" button or provide another input indicating that the cursor should advance to a next fillable field. In response to receiving the input, the electronic device may determine the next designator in the sequence (designator '2'), determine the fillable field associated with that designator (Field B), and cause the cursor to be positioned at Field B. Alternatively, the electronic device may receive input from a user indicating that the cursor should move backwards to a previous fillable field. In response to receiving that input, the electronic device may determine a previous designator in the sequence (designator '3'), determine the fillable field associated with that designator (Field C), and cause the cursor to be positioned at Field C.

In certain embodiments, an electronic device may store an indication of one or more fillable fields in one or more data stores. An electronic device may also store an indication of a fillable field's position in a sequencing framework, location information for a fillable field and/or the like.

Figure 11:
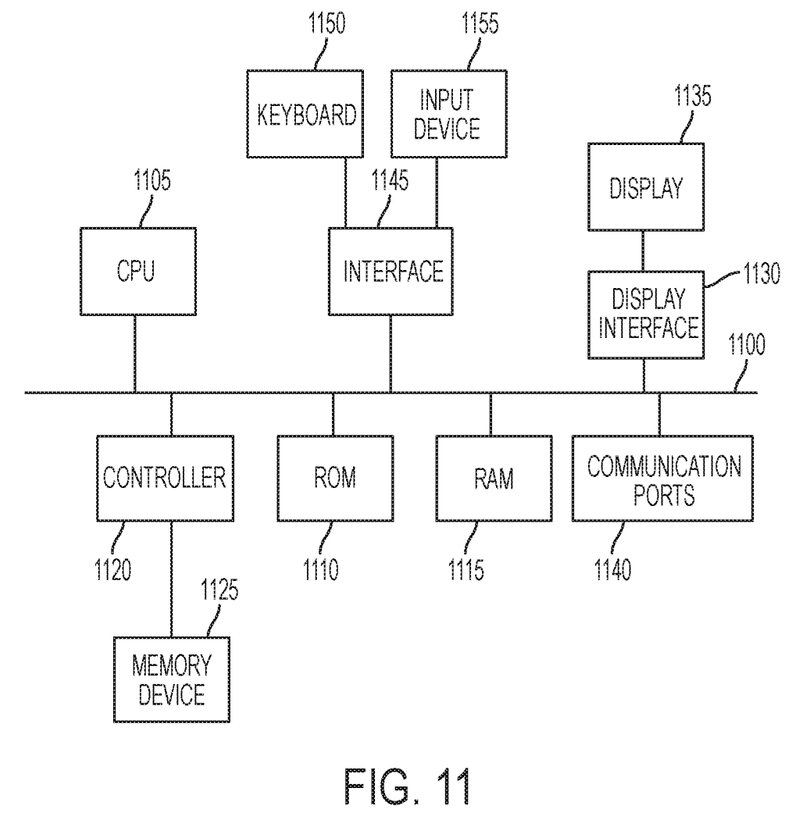
FIG. 11 illustrates a block diagram of example hardware that may be used to contain or implement program instructions according to an embodiment.

FIG. 11 depicts an example of internal hardware that may be included in any of the electronic components of the system, the user electronic device or another device in the system. An electrical bus 1100 serves as an information highway interconnecting the other illustrated components of the hardware. Processor 1105 is a central processing device of the system, configured to perform calculations and logic operations required to execute programming instructions. As used in this document and in the claims, the terms "processor" and "processing device" may refer to a single processor or any number of processors in a set of processors, whether a central processing unit (CPU) or a graphics processing unit (GPU) or a combination of the two. Read only memory (ROM), random access memory (RAM), flash memory, hard drives and other devices capable of storing electronic data constitute examples of memory devices 1125. A memory device may include a single device or a collection of devices across which data and/or instructions are stored.

An optional display interface 1130 may permit information from the bus 1100 to be displayed on a display device 1135 in visual, graphic or alphanumeric format. An audio interface and audio output (such as a speaker) also may be provided. Communication with external devices may occur using various communication devices 1140 such as a transmitter and/or receiver, antenna, an RFID tag and/or short-range or near-field communication circuitry. A communication device 1140 may be attached to a communications network, such as the Internet, a local area network or a cellular telephone data network.

The hardware may also include a user interface sensor 1145 that allows for receipt of data from input devices 1150 such as a keyboard, a mouse, a joystick, a touchscreen, a remote control, a pointing device, a video input device and/or an audio input device. Digital image frames also may be received from an imaging capturing device 1155 such as a video or camera positioned over a surgery table or as a component of a surgical device. For example, the imaging capturing device may include imaging sensors installed on a robotic surgical system. A positional sensor and motion sensor may be included as input of the system to detect position and movement of the device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

What is claimed is:

1. A method of identifying one or more fillable fields of an electronic form, the system comprising:
   receiving, by an electronic device, an electronic form, wherein the electronic form comprises an image of a document;
   identifying, by an electronic device, one or more fillable field candidates of the electronic form;
   determining, for each fillable field candidate, whether the fillable field candidate is a fillable field by:
      identifying one or more box candidates from the fillable field candidates, and
      for one or more of the box candidates:
         generating an out-border for the box candidate, wherein the out-border is a rectangular zone that surrounds an outer portion of the box candidate,
         generating an in-border for the box candidate, wherein the in-border is a rectangular zone that encompasses at least a portion of the box candidate,
         determining a histogram of pixels of the box candidate between the in-border and the out-border,
         determining a ratio of black pixels to white pixels of the histogram, and
         in response to the ratio exceeding a threshold value, determining that the box candidate is a fillable field, otherwise, determining that the box candidate is not a fillable field; and
   updating metadata associated with the electronic form by applying, by the electronic device, a sequencing framework to only the fillable fields by:
      obtaining position information for each fillable field, wherein the position information indicates a position of the fillable field on the document as displayed via a display device,
      sorting the fillable fields based on the position information to form a sequence of fillable fields,
      determining a designator to each fillable field, wherein the designator indicates a position of a corresponding fillable field in the sequence, and
      storing the designator in a data store such that it is associated with the corresponding fillable field.

2. The method of claim 1, wherein identifying the one or more box candidates from the fillable field candidates comprises one or more of the following:
   using a seed fill algorithm to identify the one or more box candidates from the fillable field candidates; or
   using a flood fill algorithm to identify the one or more box candidates from the fillable field candidates.

3. The method of claim 1, further comprising:
   in response to determining that the box candidate is a fillable field, determining whether the box candidate is a checkbox; and
   in response to determining that the box candidate is a checkbox, adding the box candidate to a checkbox list, otherwise, adding the box candidate to a box list.

4. The method of claim 1, wherein determining whether the fillable field candidate is a fillable field comprises determining whether the fillable field candidate is a line by:
   obtaining dimensions for the fillable field candidate, wherein the dimensions includes a height value and a length value; and
   in response to the height value not exceeding a first threshold value and the length value exceeding a second threshold value, identifying the fillable field candidate as a fillable field.

5. The method of claim 1, wherein determining whether the fillable field candidate is a fillable field comprises determining whether the fillable field candidate is a line by:
   obtaining dimensions for the fillable field candidate, wherein the dimensions includes a height value and a length value; and
   in response to the length value not exceeding a first threshold value and the height value exceeding a second threshold value, identifying the fillable field candidate as a fillable field.

6. The method of claim 1, wherein sorting the fillable fields based on the position information to form a sequence of fillable fields comprises sorting the fillable fields from a top of the document to a bottom of the document, and from a left side of the document to a right side of the document based on the position information.

7. The method of claim 1, further comprising:
   receiving a selection of a fillable field from a user, and causing a cursor to be displayed on a display device at the selected fillable field;
   receiving an indication from the user to move to a next fillable field;
   retrieving the designator associated with the selected fillable field from the data store;
   determining a next designator in the sequence;
   identifying, from the data store, the fillable field associated with the next designator; and
   automatically causing the cursor to be displayed on the display device at the fillable field associated with the next designator.

8. The method of claim 1, further comprising:
   receiving a selection of a fillable field from a user, and causing a cursor to be displayed on a display device at the selected fillable field;
   determining, by the electronic device, that the cursor should be moved to a next fillable field;
   retrieving the designator associated with the selected fillable field from the data store;
   determining a next designator in the sequence;
   identifying, from the data store, the fillable field associated with the next designator; and
   automatically causing the cursor to be displayed on the display device at the fillable field associated with the next designator.

9. The method of claim 1, wherein receiving, by an electronic device, an electronic form comprises capturing, by an image capture device of the electronic device, the image of the document.

10. A system of identifying one or more fillable fields of an electronic form, the system comprising:
    an electronic device;
    a computer-readable storage medium comprising one or more programming instructions that are configured to instruct the electronic device to:
       receive an electronic form, wherein the electronic form comprises an image of a document, identify one or more fillable field candidates of the electronic form,
determine, for each fillable field candidate, whether the fillable field candidate is a fillable field by:
identifying one or more box candidates from the fillable field candidates, and
for one or more of the box candidates:
generating an out-border for the box candidate, wherein the out-border is a rectangular zone that surrounds an outer portion of the box candidate,
generating an in-border for the box candidate, wherein the in-border is a rectangular zone that encompasses at least a portion of the box candidate,
determining a histogram of pixels of the box candidate between the in-border and the out-border,
determining a ratio of black pixels to white pixels of the histogram, and
in response to the ratio exceeding a threshold value, determining that the box candidate is a fillable field, otherwise, determining that the box candidate is not a fillable field, and
update metadata associated with the electronic form by applying a sequencing framework to only the fillable fields by:
obtaining position information for each fillable field, wherein the position information indicates a position of the fillable field on the document as displayed via a display device,
sorting the fillable fields based on the position information to form a sequence of fillable fields,
determining a designator to each fillable field, wherein the designator indicates a position of a corresponding fillable field in the sequence, and
storing the designator in a data store such that it is associated with the corresponding fillable field.

11. The system of claim 10, wherein the one or more programming instructions that are configured to instruct the electronic device to identify the one or more box candidates from the fillable field candidates comprise one or more programming instructions that are configured to instruct the electronic device to perform one or more of the following:
use a seed fill algorithm to identify the one or more box candidates from the fillable field candidates; or
use a flood fill algorithm to identify the one or more box candidates from the fillable field candidates.

12. The system of claim 10, wherein the computer-readable storage medium further comprises one or more programming instructions that are configured to instruct the electronic device to:
in response to determining that the box candidate is a fillable field, determine whether the box candidate is a checkbox; and
in response to determining that the box candidate is a checkbox, add the box candidate to a checkbox list, otherwise, adding the box candidate to a box list.

13. The system of claim 10, wherein the one or more programming instructions that are configured to instruct the electronic device to determine whether the fillable field candidate is a fillable field comprise one or more programming instructions that are configured to instruct the electronic device to determine whether the fillable field candidate is a line by:

obtaining dimensions for the fillable field candidate, wherein the dimensions includes a height value and a length value; and
in response to the height value not exceeding a first threshold value and the length value exceeding a second threshold value, identifying the fillable field candidate as a fillable field.

14. The system of claim 10, wherein the one or more programming instructions that are configured to instruct the electronic device to determine whether the fillable field candidate is a fillable field comprise one or more programming instructions that are configured to instruct the electronic device to determine whether the fillable field candidate is a line by:
obtaining dimensions for the fillable field candidate, wherein the dimensions includes a height value and a length value; and
in response to the length value not exceeding a first threshold value and the height value exceeding a second threshold value, identifying the fillable field candidate as a fillable field.

15. The system of claim 10, wherein the one or more programming instructions that are configured to instruct the electronic device to sort the fillable fields based on the position information to form a sequence of fillable fields comprise one or more programming instructions that are configured to instruct the electronic device to sort the fillable fields from a top of the document to a bottom of the document, and from a left side of the document to a right side of the document based on the position information.

16. The system of claim 10, wherein the computer-readable storage medium further comprises one or more programming instructions that are configured to instruct the electronic device to:
receive a selection of a fillable field from a user, and causing a cursor to be displayed on a display device at the selected fillable field;
receive an indication from the user to move to a next fillable field;
retrieve the designator associated with the selected fillable field from the data store;
determine a next designator in the sequence;
identify, from the data store, the fillable field associated with the next designator; and
automatically cause the cursor to be displayed on the display device at the fillable field associated with the next designator.

17. The system of claim 10, wherein the computer-readable storage medium further comprises one or more programming instructions that are configured to instruct the electronic device to:
receive a selection of a fillable field from a user, and causing a cursor to be displayed on a display device at the selected fillable field;
determine that the cursor should be moved to a next fillable field;
retrieve the designator associated with the selected fillable field from the data store;
determine a next designator in the sequence;
identify, from the data store, the fillable field associated with the next designator; and
automatically cause the cursor to be displayed on the display device at the fillable field associated with the next designator.

18. The system of claim 10, wherein the one or more programming instructions that are configured to instruct the electronic device to receive an electronic form comprise one or more programming instructions that are configured to instruct the electronic device to capture, by an image capture device of the electronic device, the image of the document.

* * * * *